(12) United States Patent
Yamanishi et al.

(10) Patent No.: US 12,319,991 B2
(45) Date of Patent: Jun. 3, 2025

(54) BASE MATERIAL AND CUTTING TOOL

(71) Applicant: Sumitomo Electric Industries, Ltd., Osaka (JP)

(72) Inventors: Takato Yamanishi, Osaka (JP); Keiichi Tsuda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 611 days.

(21) Appl. No.: 17/776,245

(22) PCT Filed: Apr. 1, 2021

(86) PCT No.: PCT/JP2021/014191
§ 371 (c)(1),
(2) Date: May 12, 2022

(87) PCT Pub. No.: WO2021/240995
PCT Pub. Date: Dec. 2, 2021

(65) Prior Publication Data
US 2022/0389544 A1    Dec. 8, 2022

(30) Foreign Application Priority Data
May 26, 2020   (JP) ................. 2020-091481

(51) Int. Cl.
 C22C 29/08         (2006.01)
 B23B 27/14         (2006.01)
(52) U.S. Cl.
 CPC ............ *C22C 29/08* (2013.01); *B23B 27/148* (2013.01)

(58) Field of Classification Search
 CPC ....... C22C 29/08; C22C 29/02; B23B 27/148; C23C 30/005; B22F 2003/242; B22F 2005/001; B22F 2999/00; B22F 5/00; B22F 3/24
 See application file for complete search history.

(56) References Cited

U.S. PATENT DOCUMENTS

| | | | |
|---|---|---|---|
| 2002/0174750 A1 | 11/2002 | Hessman et al. | |
| 2012/0114960 A1* | 5/2012 | Takesawa | C22C 1/051 428/565 |
| 2012/0263944 A1 | 10/2012 | Kinoshita et al. | |
| 2019/0112679 A1 | 4/2019 | Flasar | |

FOREIGN PATENT DOCUMENTS

| | | | | |
|---|---|---|---|---|
| EP | 2177639 A1 * | 4/2010 | | B22F 7/06 |
| JP | 58-31059 A | 2/1983 | | |
| JP | 2003-1505 A | 1/2003 | | |
| JP | 2016-30846 A | 3/2016 | | |
| JP | 2019-151875 A | 9/2019 | | |

* cited by examiner

*Primary Examiner* — Alexandra M Moore
(74) *Attorney, Agent, or Firm* — XSENSUS LLP

(57) ABSTRACT

A base material according to an aspect of the present disclosure is made of a cemented carbide. The cemented carbide includes a first hard phase and a binder phase. The first hard phase consists of WC particles. The binder phase includes at least one element selected from Co and Ni. The base material includes a body portion, and a surface portion provided on a surface of the body portion. The surface portion has a thickness less than or equal to an average particle size in the first hard phase. A ratio (B/A) of an area proportion (B) of the binder phase in a surface of the surface portion to an area proportion (A) of the binder phase in a cross section of the body portion is not less than 1.2 and not more than 2.0.

14 Claims, 5 Drawing Sheets

BASE MATERIAL AND CUTTING TOOL

CROSS-REFERENCE TO RELATED APPLICATIONS

The present application is based on PCT/JP2021/014191 filed on Apr. 1, 2021, which claims priority to Japanese Application No. 2020-091481, filed on May 26, 2020, the entire contents of each are incorporated herein by reference.

TECHNICAL FIELD

The present disclosure relates to a base material and a cutting tool.

BACKGROUND ART

In recent years, titanium alloys have been widely used in a variety of applications such as aircraft parts, and there is also an increasing demand for processing them. Titanium alloys have high properties as a structural material, but they are therefore difficult to process. In particular, chipping caused by wear or melting and deposition of titanium alloys due to high temperature tends to be a problem. While various techniques have attempted to improve tool life by controlling the surface of a cemented carbide tool, the demand for processing titanium alloys has not yet been sufficiently satisfied.

For example, PTL 1 (Japanese Patent Laying-Open No. 2003-1505) discloses a technique related to a tool material in which high compressive stress is applied to WC present in a surface portion of a cemented carbide, although not a titanium alloy, to thereby improve performance, and a tool material in which oxides are embedded in a surface to thereby suppress chipping caused by melting and deposition of a titanium alloy.

CITATION LIST

Patent Literature

PTL 1: Japanese Patent Laying-Open No. 2003-1505

SUMMARY OF INVENTION

A base material according to an aspect of the present disclosure is made of a cemented carbide.

The cemented carbide includes a first hard phase and a binder phase.

The first hard phase consists of WC particles.

The binder phase includes at least one element selected from Co and Ni.

The base material includes a body portion, and a surface portion provided on a surface of the body portion.

The surface portion has a thickness less than or equal to an average particle size in the first hard phase.

A ratio (B/A) of an area proportion (B) of the binder phase in a surface of the surface portion to an area proportion (A) of the binder phase in a cross section of the body portion is not less than 1.2 and not more than 2.0.

A cutting tool according to an aspect of the present disclosure includes the base material.

DETAILED DESCRIPTION

[Problem to be Solved by the Present Disclosure]

Due to its high reactivity, a titanium alloy tends to be melted and deposited on a cutting tool edge, and its repeated melting and deposition as well as peel-off readily causes chipping or reactive wear of the tool edge.

Melting and deposition is significantly affected by the shape and the surface condition of a tool edge. Thus, there have been attempts to reduce the melting and deposition itself, or to control the composition and structure of a cutting tool surface in order to increase chipping resistance. However, commonly used techniques of coating a cutting tool are not very effective in processing of titanium alloys, and there is thus a need for further improvement in tool life to satisfy the market demand.

Figure 3:
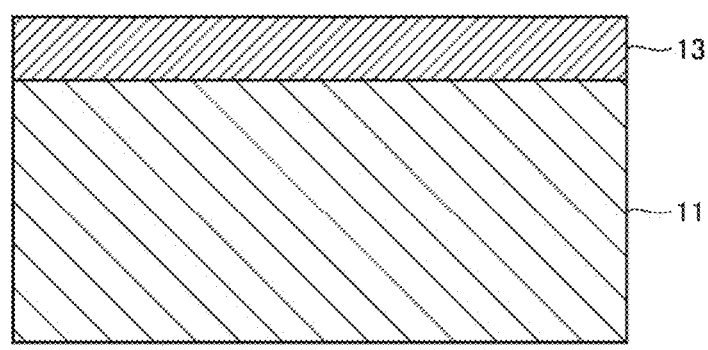
FIG. 3 is an enlarged cross-sectional view of a conventional base material.
Figure 4:
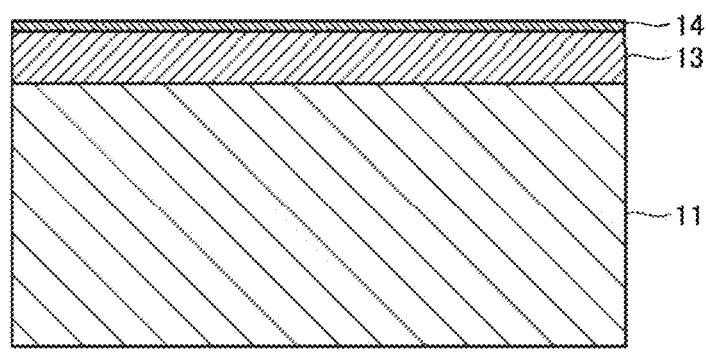
FIG. 4 is an enlarged cross-sectional view of another conventional base material.

The formation of a surface layer 13 having a predetermined thickness in a cutting tool 1 (see FIGS. 3 and 4) causes a reduction in a property that is in a trade-off relationship with a property (wear resistance) that is intended to be improved. For example, increased hardness results in insufficient toughness. Thus, it is not desirable to improve wear resistance to a titanium alloy by way of forming surface layer 13 having a predetermined thickness.

Therefore, an object of the present disclosure is to provide a base material having a high wear resistance to a titanium alloy, and a cutting tool including the base material.

Advantageous Effect of the Present Disclosure

According to the foregoing, there can be provided a base material having a high wear resistance to a titanium alloy, and a cutting tool including the base material.

DESCRIPTION OF EMBODIMENTS

First, a description will be given of aspects of the present disclosure.

The expression "A to B" as used herein is intended to define an upper limit and a lower limit of a certain range (i.e., from A to B inclusive). As to "A to B" where A is not followed by a unit symbol and only B is followed by a unit symbol, the unit of A is the same as the unit of B.

[1] A base material according to an aspect of the present disclosure is made of a cemented carbide.

The cemented carbide includes a first hard phase and a binder phase.

The first hard phase consists of WC particles.

The binder phase includes at least one element selected from Co and Ni.

The base material includes a body portion, and a surface portion provided on a surface of the body portion.

The surface portion has a thickness less than or equal to an average particle size in the first hard phase.

A ratio (B/A) of an area proportion (B) of the binder phase in a surface of the surface portion to an area proportion (A) of the binder phase in a cross section of the body portion is not less than 1.2 and not more than 2.0.

In the base material according to the present disclosure, the ratio of the binder phase is low only in the vicinity of the surface (surface portion) of the base material. Thus, drop-off of the WC particles (first hard phase) during wear can be suppressed by a sufficient amount of the binder phase in the body portion other than the surface portion, while acceleration of wear due to reaction between the binder phase and a titanium alloy is suppressed. Therefore, the base material has a high wear resistance to a titanium alloy.

[2] Preferably, the cemented carbide further includes a second hard phase. The second hard phase is made of a compound of at least one element selected from the group consisting of Group IV elements and Group V elements in the periodic table, and at least one element selected from the group consisting of C, N, O and B, or a solid solution of the compound.

When the cemented carbide forming the base material includes the second hard phase, it is expected that the properties of the base material such as heat resistance will be improved.

[3] A cutting tool according to an aspect of the present disclosure includes the base material.

Since the base material having a high wear resistance to a titanium alloy is used, the life of the cutting tool can be increased when the cutting tool is used to cut a titanium alloy and the like.

[4] Preferably, the base material includes a coating on at least a part of its surface.

Since the coating is provided, the wear resistance and the like of the cutting tool are further improved, and the life of the cutting tool can thus be further increased.

Detailed Description of Embodiments

In the following, a description will be given of an embodiment of the present disclosure (hereinafter called "the present embodiment"). However, the following description does not limit the present disclosure. In addition, a compound or the like expressed herein by a chemical formula includes the compound with any of all conventionally known atomic ratios if the atomic ratio is not particularly limited, and the compound is not necessarily limited to the compound with a stoichiometric ratio.

<Base Material>

Figure 1:
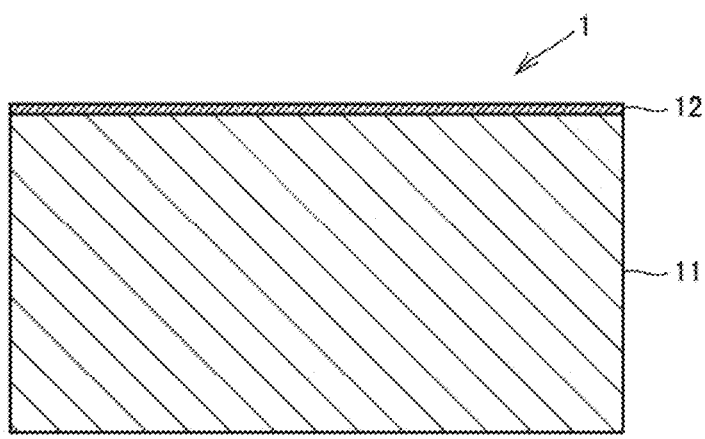
FIG. 1 is a schematic cross-sectional view of a base material according to an embodiment.

With reference to FIG. 1, a base material 1 according to the present embodiment is made of a cemented carbide. The cemented carbide includes a first hard phase and a binder phase. The first hard phase consists of WC particles. The binder phase includes at least one element selected from Co and Ni.

Base material 1 includes a body portion 11, and a surface portion 12 provided on a surface of body portion 11. Surface portion 12 has a thickness less than or equal to an average particle size in the first hard phase.

A ratio (B/A) of an area proportion (B) of the binder phase in a surface of the surface portion to an area proportion (A) of the binder phase in a cross section of the body portion is not less than 1.2 and not more than 2.0.

(Body Portion and Surface Portion)

With reference to FIG. 1, a base material 1 includes a body portion 11, and a surface portion 12 provided on a surface of body portion 11.

Figure 2:
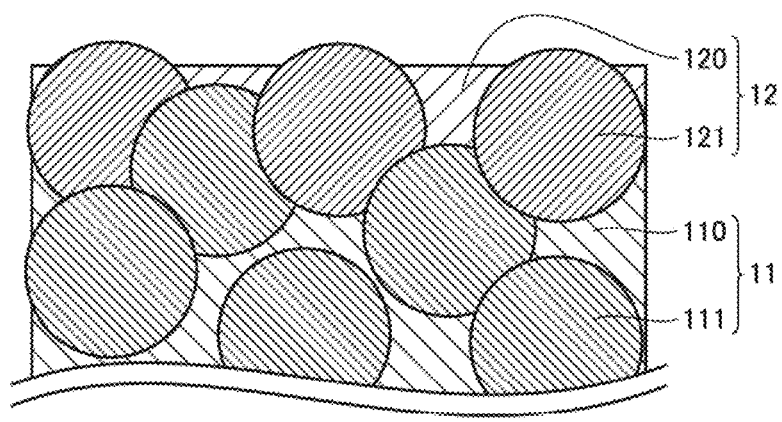
FIG. 2 is a conceptual diagram illustrating a surface portion of the base material according to the embodiment.

With reference to FIG. 2, body portion 11 is formed of a binder phase 110, a first hard phase (WC particles) 111, and the like. Surface portion 12 is also formed of a binder phase 120, a first hard phase (WC particles) 121, and the like, but with a different ratio of the binder phase from that of body portion 11.

Surface portion 12 has a thickness less than or equal to an average particle size in the first hard phase.

The thickness of surface portion 12 can be measured by a method described below.

An SEM is used to continuously measure a predetermined cross section of the base material along a predetermined line extending in the thickness direction of the base material from the surface toward the interior of the base material, at a magnification of from 3000× to 5000× and with a field of view of 18 μm×25 μm, for example. A distance in the thickness direction is thus measured from the surface of the base material to a portion immediately before a field of view where the area proportion of the binder phase exceeds 0.05 for the first time. The same measurement is then conducted at any three locations of the base material, and an average value of the measured distances is defined as the thickness of surface portion 12.

A ratio (B/A) of an area proportion (B) of the binder phase in a surface of the surface portion to an area proportion (A) of the binder phase in a cross section of the body portion is not less than 1.2 and not more than 2.0.

When B/A is less than 1.2, that is, when the amount of the binder phase in the surface is relatively small, the force to retain the WC particles is small, and the WC particles readily drop off due to melting and deposition as well as peel-off of a titanium alloy during cutting of the titanium alloy, resulting in accelerated chipping and wear. When B/A is more than 2.0, that is, when the amount of the binder phase in the surface is excessively large, wear resistance to a titanium alloy decreases such as due to increased melting and deposition itself caused by the effect of Co and Ni that react readily with a titanium alloy, or acceleration of diffusion wear.

B/A is preferably not less than 1.4 and not more than 1.7, in which case a good balance is achieved between the advantageous effect of reduced melting and deposition and the advantageous effect of increased force to retain the WC particles, and the wear resistance to a titanium alloy is thus further improved.

Even if B/A is not less than 1.2 and not more than 2.0, when there is another layer such as between the surface portion and the body portion that has a different composition or the like from those of the surface portion and the body portion, the diffusion wear or the melting and deposition may increase, causing a reduction in wear resistance of the cutting tool. For this reason, preferably there is no other layer such as between the surface portion and the body portion that has a different composition or the like from that of the surface portion or the body portion.

The area proportion (B) of the binder phase in the surface of the surface portion refers to the proportion of the area of the binder phase in a planar image (two-dimensional image) when an arbitrary surface of the surface portion of the base material is viewed in a direction perpendicular to this surface (direction of the normal to this surface).

The area proportion (A) of the binder phase in the cross section of the body portion refers to the proportion of the area of the binder phase in a planar image (two-dimensional image) when an arbitrary cross section of the base material is viewed in a direction perpendicular to this cross section (direction of the normal to this cross section). The cross section of the body portion (cross section perpendicular to the surface) herein refers to the cross section of the base material excluding the cross section of the surface portion (area from the surface of the base material to the same depth as the average particle size in the first hard phase).

The actual area of each of the surface of the surface portion and the cross section is different from the area of the planar image (for example, the area of a projected image in an SEM photograph) due to unevenness of the surface and the cross section, but this is not taken into account.

The area proportions (A and B) of the binder phase in the planar images can be measured by a method using image analysis software, which will be described later in "<Method for Evaluating Physical Properties of Base Material>."

In the present embodiment, the body portion preferably has a uniform structure. When the body portion has a uniform structure, an arbitrary cross section of the base material observed with an SEM shows that the body portion other than a region (surface portion) having an interface with the outside of the base material includes no clearly separable region different from the surface portion.

(First Hard Phase)

The first hard phase consists of WC particles.

The average particle size in the first hard phase preferably ranges from 0.1 to 5.0 µm, and more preferably ranges from 0.5 to 3.0 µm. In this range, a sufficiently hard and dense cemented carbide can be readily obtained.

The average particle size as used herein is a Heywood diameter calculated by the method using image analysis software, which will be described later in "<Method for Evaluating Physical Properties of Base Material>."

(Binder Phase)

The binder phase includes at least one element selected from Co and Ni. The binder phase may further include other elements to the extent that the advantageous effects of the present disclosure are produced.

(Second Hard Phase)

The cemented carbide preferably further includes a second hard phase. The second hard phase is made of a compound of at least one element selected from the group consisting of Group IV elements and Group V elements in the periodic table, and at least one element selected from the group consisting of C, N, O and B, or a solid solution of the compound. Since the cemented carbide includes the second hard phase, advantageous effects such as improved oxidation resistance and reaction resistance, and suppressed crack occurrence due to an impact on the base material can be provided to the base material.

Examples of the at least one element selected from the group consisting of Group IV elements and Group V elements in the periodic table include titanium (Ti), zirconium (Zr), hafnium (Hf), vanadium (V), niobium (Nb), and tantalum (Ta). Examples of the compound include TiC, NbC, TaC, ZrC, ZrCN, VC, TaNbC, TiN, and TiCN.

The average particle size in the second hard phase preferably ranges from 0.1 to 3.0 µm, and more preferably ranges from 0.2 to 0.5 µm. In this case, a dense cemented carbide can be readily obtained.

The first hard phase and the second hard phase are preferably included in a state of being dispersed in the binder phase. This improves the wear resistance of the cemented carbide (base material) at high temperatures. The first hard phase, the second hard phase and the binder phase are more preferably included in a state of being uniformly dispersed in the cemented carbide. "Uniformly dispersed" herein means that the first hard phase (and the second hard phase) and the binder phase are in contact with each other, and that they are present in the cemented carbide with relatively little contact between phases of the same type.

The cemented carbide may include components other than those described above. For example, the cemented carbide may include inevitable impurities (such as B, N and/or O) to the extent that the advantageous effects of the present disclosure are not compromised. The cemented carbide may also include free carbon or an abnormal phase called η phase in the structure thereof.

The base material according to the present embodiment can be widely used as a cutting tool, and is capable of forming a smooth cutting surface on the surface of a workpiece over a long period of time. In particular, the base material can be suitably used as a cutting tool for cutting a workpiece including a titanium alloy.

<Method for Evaluating Physical Properties of Base Material>

The area proportions of the binder phase in the surface and the cross section of the base material can be determined by a method described below, for example.

Figure 5:
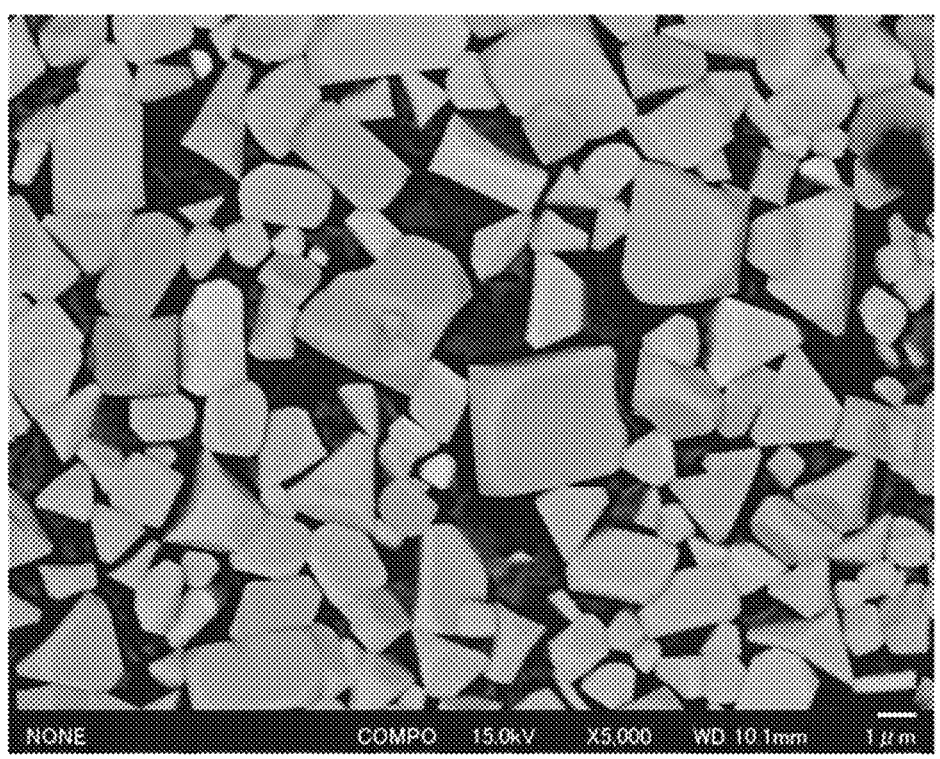
FIG. 5 shows an exemplary SEM photograph of a surface of a base material.

An arbitrary surface of the base material (cemented carbide), or an arbitrary cross section of the base material (cemented carbide) obtained with a focused ion beam apparatus, a cross section polisher apparatus, and/or the like is imaged with an SEM (Scanning Electron Microscope) at a magnification of 5000× in a direction perpendicular to the surface or the cross section, and accordingly, its electronic images of any number of fields of view equal to or more than 10 fields of view (for example, 10 fields of view) are obtained (see FIG. 5). It is followed by elemental mapping of a predetermined region (12 µm×9 µm) of each electronic image with the use of EPMA (Electron Probe Micro-Analysis) or EDX (Energy Dispersive X-ray spectrometry) attached to the SEM.

In the resulting elemental mapping, particles including WC are defined as first hard phase; a phase including no WC and including at least one of Co and Ni is defined as binder phase; and particles including no WC and including at least one of Group IV elements and Group V elements in the periodic table, and at least one selected from the group consisting of C, N, O and B are defined as second hard phase.

With respect to the area proportion of the binder phase in each site of the base material, these SEM images (elemental mapping) are used to calculate a total area of the binder phase with image analysis software ("Mac-View I" manufactured by Mountech Co., Ltd.) or the like. The proportion of the total area of the binder phase (area proportion of the binder phase) to a total area of all of the fields of view is calculated. The same procedure is performed on all of the imaged fields of view, and an average value of the area proportions of the binder phase is calculated.

Such analysis can also be used to identify where in the base material the hard phases (the first hard phase and the second hard phase) and the binder phase are included, and to identify the composition of each phase.

Furthermore, the SEM images (elemental mapping) can be used to calculate an average particle size (Heywood diameter: an average value of diameters of imaginary circles having the same area as the particle) in each of the first hard phase and the second hard phase present in the base material with image analysis software ("Mac-View I" manufactured by Mountech Co., Ltd.).

<Manufacture of Base Material>

The base material (cutting tool) according to the present embodiment can be manufactured, for example, by a manufacturing method including a mixing step, a molding step, a sintering step, and a cooling step, which will be described in detail below. In order to achieve the characteristic configuration of the base material according to the present embodiment, it is important to control the pressure after a liquid phase emerges in the sintering step, and the cooling rate in the cooling step.

(Raw Material Powder)

A powder of at least one element selected from Co and Ni is used as a raw material powder forming a binder phase. A powder of WC itself forming a first hard phase, and a powder of a compound or the like itself forming a second hard phase are used as raw material powders forming hard phases. The FSSS (Fisher Sub-Sieve Sizer) particle sizes of these powders preferably range from 0.5 to 10 μm. The FSSS particle size can be measured by laser diffractometry or the like.

The ratio of WC particles forming the first hard phase in raw material powders forming a cemented carbide preferably ranges from 70 to 95 mass %, and more preferably ranges from 85 to 95 mass %.

The ratio of a total of Co and Ni forming the binder phase in the raw material powders forming the cemented carbide preferably ranges from 5 to 15 mass %, and more preferably ranges from 5 to 10 mass %.

When the cemented carbide includes a second binder phase, the ratio of a total of a compound forming the second hard phase in the raw material powders forming the cemented carbide preferably ranges from 0 to 15 mass %, and more preferably ranges from 0 to 5 mass %.

When the cemented carbide includes a first hard phase, a binder phase and a second hard phase, it is preferable that, in a raw material composition of the cemented carbide at the time of blending, the ratio of WC forming the first hard phase range from 70 to 95 mass %, the ratio of a total of Co and Ni forming the binder phase range from 5 to 15 mass %, and the ratio of a total of a compound forming the second hard phase range from 0 to 15 mass %, in order to ensure sufficient hardness and denseness for use in a cutting tool for a titanium alloy.

Furthermore, it is more preferable that, in the raw material composition of the cemented carbide at the time of blending, the ratio of WC forming the first hard phase range from 85 to 95 mass %, the ratio of the total of Co and Ni forming the binder phase range from 5 to 10 mass %, and the ratio of the total of the compound forming the second hard phase range from 0 to 5 mass %, in order to maintain the hardness and the toughness of the cemented carbide in a good balance.

Such compositional ratios of the raw material powders are reflected in compositional ratios of a cutting tool finally provided.

(Mixing Step)

The mixing step involves mixing the raw material powders to obtain a mixed powder.

An attritor, a ball mill, a bead mill, a mortar, a jet mill, and/or the like can be used for the mixing.

The mixing time preferably ranges from 0.1 to 48 hours, and more preferably ranges from 2 to 15 hours from the viewpoint of homogeneously mixing the raw material powders in a balanced manner.

(Molding Step)

The molding step involves placing the mixed powder obtained in the mixing step into a mold and then pressing it, to obtain a press-molded body (the base material or the cutting tool before sintering).

A cemented carbide mold (such as a Ta capsule) can be used, for example, as the mold. The method of molding is not particularly limited as long as it is performed under general conditions. The pressing pressure preferably ranges from 10 MPa to 16 GPa.

(Sintering Step)

The sintering step involves sintering the press-molded body obtained in the molding step.

The maximum temperature of sintering preferably ranges from 1400 to 1600° C. The duration to keep at the maximum temperature ranges from 0.5 to 2 hours, for example. These conditions are not particularly limited as long as they are within the usual range within which a cemented carbide can be produced.

The sintering step is preferably performed in an atmosphere of inert gas such as argon gas. Preferably, regardless of the maximum temperature, once the temperature exceeds 1350° C. (after a liquid phase emerges) during temperature rise, the atmosphere of sintering is converted to an atmosphere in which a pressure ranging from 100 to 400 kPaG is applied.

(Cooling Step)

The cooling step involves cooling the sintered material (the base material or the cutting tool) after the sintering.

In the cooling step, the time taken to reduce the temperature of the base material (cutting tool) from the maximum temperature to 1300° C. preferably ranges from 0.2 to 1 hour. The cooling rate in a region of less than 1300° C. is not particularly limited.

The cooling step is preferably performed in an inert gas atmosphere. The partial pressure of the atmosphere gas in the cooling step preferably ranges from 100 to 400 kPaG.

(Principle)

In the following, the principle of achieving the characteristic configuration of the base material according to the present embodiment by the manufacturing method will be described.

Usually, when a cemented carbide is sintered, binder phase elements (Co and/or Ni) turn into a liquid phase at about 1320° C. (which varies depending on the carbon content), which then facilitates densification of the alloy. At this time, the liquid phase migrates due to the temperature difference between the interior and the surface of the alloy or the atmosphere. This results in a variation in the amount of the binder phase and/or the particle size in a hard phase between the surface and the interior.

Utilizing this property, conventional techniques control the surface of a base material (cemented carbide) (form a layer having some function) by using nitrogen or hydrogen as atmosphere gas or by controlling the cooling rate. When the composition includes nitrogen in a second hard phase, a layer different from the interior (body portion) tends to be formed on the surface of the base material. In most conventional techniques, the atmosphere gas is depressurized in order to form a layer having some function, except for when it is pressurized for the purpose of facilitating alloy densification. Under reduced pressure, however, volatilization of the binder phase elements and carbon tends to occur from the surface of the base material, resulting in a reduced amount of the binder phase in the surface of the base material. On the other hand, even under increased pressure, application of excessive pressure inhibits the migration due to elemental diffusion and a liquid phase flow of the liquid phase and carbon to the surface, resulting in a reduced amount of the binder phase in the surface of the base material.

The amount of the binder phase in the surface of the base material is also significantly affected by the cooling rate. In conventional techniques, the cooling rate is controlled either for rapid cooling from the maximum temperature or for providing the surface with some function. In the case of rapid cooling, there is not enough time for the liquid phase migration, resulting in a relatively small amount of the binder phase in the surface of the base material. When the cooling rate is slow, on the other hand, the liquid phase migration tends to occur, and thus, a binder-phase-rich region tends to be formed in the surface portion of the base material due to the difference in carbon content between the interior and the exterior.

In view of the foregoing, in the present embodiment, the atmosphere before and after the liquid phase emerges is set to an appropriately pressurized atmosphere to ensure that there is as little difference in carbon content as possible between the interior and the surface of the alloy in the sintering step, and then the cooling rate is set so as to minimize the liquid phase migration in the cooling step. As a result, only the surface portion ranging from the surface of the base material to only a small depth can be turned into a binder-phase-rich alloy.

<Cutting Tool>

The cutting tool according to the present embodiment includes the base material. Since the base material made of the cemented carbide with improved wear resistance to a titanium alloy is used, the life of the cutting tool can be increased particularly when cutting a workpiece including a titanium alloy.

Examples of the cutting tool can include a drill, an end mill, an indexable cutting insert for a drill, an indexable cutting insert for an end mill, an indexable cutting insert for milling, an indexable cutting insert for turning, a metal-slitting saw, a gear cutting tool, a reamer, and a tap.

(Coating)

The cutting tool may also include a coating on at least a part of a surface of the base material. Since the coating is provided, the wear resistance or the like of the cutting tool is further improved, and the life of the cutting tool can thus be further increased. The cutting tool can also be provided with properties attributable to the coating.

A coating having a thermal expansion coefficient of not less than $7 \times 10^{-6}$/K and not more than $9 \times 10^{-6}$/K is preferably used as the coating. A nitride or a carbonitride of one or more elements selected from the group consisting of Ti, Al, Cr, Si, Hf, Zr, Mo, Nb, Ta, V and W is preferable as a composition of the coating.

Furthermore, the coating preferably has oxidation resistance at 1000° C. or higher. "Having oxidation resistance at 1000° C. or higher" herein means that weight increase occurs at 1000° C. or higher as a result of evaluation of the coating in the atmosphere using a thermogravimetry/differential thermal analysis (TG/DTA) device. Examples of a suitable composition of the coating having such oxidation resistance can include AlTiSiN, AlCrN, TiZrSiN, CrTaN, HfWSiN, CrAlN and the like.

The coating as described above can be formed by either a physical vapor deposition (PVD) method or a chemical vapor deposition (CVD) method. A coating formed by the CVD method tends to have excellent adhesiveness with the base material. Examples of the CVD method include a thermal CVD method. A coating formed by the PVD method tends to be provided with compressive residual stress, and thus its toughness can be readily increased. A cathode arc ion plating method can also be used from the viewpoint of significantly enhancing the adhesiveness between the coating and the cemented carbide (base material).

The coating of the cutting tool according to the present embodiment is preferably provided on a portion of the base material to serve as a cutting edge, and near this portion. The coating may be provided on the entire surface of the base material. The coating may be a single layer or multiple layers. The coating has a thickness of preferably not less than 1 μm and not more than 20 μm, and more preferably not less than 1.5 μm and not more than 15 μm.

EXAMPLES

In the following, the present disclosure will be described in further detail with reference to Examples. The present disclosure, however, is not limited to them.

Examples 1 to 16 and Comparative Examples 101 to 111

First, CNMG432-shaped (manufactured by Sumitomo Electric Hardmetal) throw-away inserts (cutting tools) made of cemented carbide according to Examples 1 to 16 and Comparative Examples 101 to 111 were produced in the same way as the method for manufacturing the base material described in the embodiment above, with the use of several types of compound powders and metal powders represented by a blend composition listed in Table 1 (WC, NbC, TaC, Co and Ni) as raw material powders.

In the mixing step, the mixing was performed with an attritor for 12 hours. The pressing pressure in the molding step was 100 MPa. The maximum temperature in the sintering step was 1450° C., and the duration to keep at the maximum temperature was 1 hour. The atmosphere gas in the cooling step was argon gas, and the partial pressure of the atmosphere gas was 400 kPaG.

The atmosphere pressure in the sintering step and the cooling time in the cooling step (time taken to reduce the temperature from the maximum temperature to 1300° C.) were as described in Table 1.

For the base material obtained in each Example and Comparative Example, the area proportion (A) of the binder phase in the cross section of the body portion, and the area proportion (B) of the binder phase in the surface of the surface portion were measured by the method described in the embodiment above. The ratio (B/A) of the area proportion (B) of the binder phase in the surface of the surface portion to the area proportion (A) of the binder phase in the cross section of the body portion was also calculated. Results of the measurement are shown in Table 1.

For the base material in each Example and Comparative Example, the thickness of the surface portion was measured by the method described in the embodiment above. Results of the measurement showed that the thickness of the surface portion was less than or equal to the average particle size in the first hard phase (C particles) in Examples 1 to 16 and Comparative Examples 101 to 111. Results of the measurement of the average particle sizes in the first hard phase and second hard phase by the method described in the embodiment above are shown in Table 1.

<Evaluation of Wear Resistance>

For the throw-away insert (cutting tool) obtained in each Example and Comparative Example, an evaluation of wear resistance described below was conducted.

For each cutting tool, a cutting time elapsed before the amount of wear of a flank face of a cutting tool edge reached 0.2 mm was measured in a high-load cutting test (wear resistance test) under cutting conditions indicated below. Results of the measurement of the cutting time are shown in Table 1. The cutting time shown in Table 1 is the average of times measured at four corners of each cutting tool. Table 1 shows that as the cutting time is longer, the wear resistance is better.

(Cutting Conditions)
 Workpiece: Ti alloy (Ti-6Al-4V)
 Cutting speed (Vc): 70 m/min
 Depth of Cut (ap): 2.5 mm
 Feed (f): 0.2 mm/rev
 Cutting environment: WET

TABLE 1

| | | Blend composition (mass %) | | | | Sintering conditions | | A Amount of binder phase in body portion | B Amount of binder phase in surface portion | | Average particle size (μm) | | Cutting time |
|---|---|---|---|---|---|---|---|---|---|---|---|---|---|
| | | | | | | Atmosphere pressure | Cooling time | | | | First hard | Second hard | |
| | | WC | NbC | TaC | Co | Ni | (kPaG) | (h) | (area %) | (area %) | B/A | phase | phase | (min) |
| Ex. | 1 | 94.0 | 0.0 | 0.0 | 6.0 | 0.0 | 150.0 | 0.3 | 10.3 | 15.6 | 1.51 | 1.06 | — | 25 |
| | 2 | 94.0 | 0.0 | 0.0 | 6.0 | 0.0 | 150.0 | 1.0 | 10.4 | 20.4 | 1.96 | 1.03 | — | 22 |
| | 3 | 94.0 | 0.0 | 0.0 | 6.0 | 0.0 | 400.0 | 0.3 | 10.2 | 12.5 | 1.23 | 1.11 | — | 21 |
| | 4 | 94.0 | 0.0 | 0.0 | 6.0 | 0.0 | 100.0 | 0.6 | 10.3 | 17.4 | 1.69 | 1.11 | — | 25 |
| | 5 | 88.0 | 0.0 | 0.0 | 12.0 | 0.0 | 150.0 | 0.2 | 19.5 | 25.6 | 1.31 | 1.09 | — | 18 |
| | 6 | 88.0 | 0.0 | 0.0 | 6.0 | 6.0 | 150.0 | 0.2 | 19.4 | 28.9 | 1.49 | 1.06 | — | 18 |
| | 7 | 88.0 | 2.0 | 0.0 | 10.0 | 0.0 | 150.0 | 0.3 | 16.1 | 23.5 | 1.46 | 1.06 | 0.35 | 21 |
| | 8 | 81.0 | 0.0 | 9.0 | 10.0 | 0.0 | 150.0 | 0.3 | 16.5 | 27.0 | 1.64 | 1.08 | 0.33 | 20 |
| | 9 | 86.0 | 0.0 | 4.0 | 10.0 | 0.0 | 150.0 | 0.3 | 16.2 | 24.5 | 1.51 | 1.10 | 0.41 | 20 |
| | 10 | 65.0 | 25.0 | 0.0 | 10.0 | 0.0 | 150.0 | 0.3 | 13.9 | 19.9 | 1.43 | 1.11 | 0.45 | 18 |
| | 11 | 91.0 | 0.0 | 0.0 | 9.0 | 0.0 | 150.0 | 0.3 | 14.8 | 22.2 | 1.50 | 1.02 | — | 21 |
| | 12 | 91.0 | 0.0 | 0.0 | 0.0 | 9.0 | 150.0 | 0.3 | 14.9 | 22.3 | 1.50 | 1.35 | — | 21 |
| | 13 | 91.0 | 0.0 | 0.0 | 9.0 | 0.0 | 150.0 | 0.3 | 14.9 | 26.0 | 1.74 | 0.39 | — | 18 |
| | 14 | 91.0 | 0.0 | 0.0 | 9.0 | 0.0 | 150.0 | 0.3 | 14.8 | 24.5 | 1.66 | 3.55 | — | 18 |
| | 15 | 87.0 | 2.0 | 0.0 | 11.0 | 0.0 | 150.0 | 0.3 | 17.5 | 27.3 | 1.56 | 1.21 | 0.13 | 17 |
| | 16 | 87.0 | 2.0 | 0.0 | 11.0 | 0.0 | 150.0 | 0.3 | 17.6 | 26.5 | 1.51 | 1.25 | 0.89 | 17 |
| Comp. Ex. | 101 | 94.0 | 0.0 | 0.0 | 6.0 | 0.0 | Vacuum | 0.5 | 10.4 | 6.5 | 0.63 | 1.06 | — | 13 |
| | 102 | 94.0 | 0.0 | 0.0 | 6.0 | 0.0 | 80.0 | 0.3 | 10.4 | 11.3 | 1.09 | 1.05 | — | 15 |
| | 103 | 94.0 | 0.0 | 0.0 | 6.0 | 0.0 | 150.0 | 0.1 | 10.3 | 9.9 | 0.96 | 1.07 | — | 13 |
| | 104 | 94.0 | 0.0 | 0.0 | 6.0 | 0.0 | Vacuum | 1.5 | 15.3 | 35.2 | 2.30 | 1.07 | | 12 |
| | 105 | 88.0 | 0.0 | 0.0 | 6.0 | 0.0 | 150.0 | 1.5 | 17.3 | 19.6 | 1.13 | 1.05 | — | 16 |
| | 106 | 88.0 | 0.0 | 0.0 | 6.0 | 6.0 | 500.0 | 0.2 | 10.5 | 5.2 | 0.50 | 1.04 | — | 13 |
| | 107 | 88.0 | 2.0 | 0.0 | 10.0 | 0.0 | Vacuum | 0.5 | 19.3 | 10.3 | 0.53 | 1.06 | — | 10 |
| | 108 | 81.0 | 0.0 | 9.0 | 10.0 | 0.0 | Vacuum | 0.5 | 16.2 | 11.2 | 0.69 | 1.04 | 0.38 | 11 |
| | 109 | 86.0 | 0.0 | 4.0 | 10.0 | 0.0 | Vacuum | 0.5 | 16.3 | 13.2 | 0.81 | 1.08 | 0.34 | 11 |
| | 110 | 65.0 | 25.0 | 0.0 | 10.0 | 0.0 | Vacuum | 0.5 | 15 | 10.2 | 0.68 | 1.05 | — | 12 |
| | 111 | 91.0 | 0.0 | 0.0 | 9.0 | 0.0 | Vacuum | 0.5 | 14.9 | 11.9 | 0.80 | 1.32 | — | 12 |

Results in Table 1 show that the cutting time is longer and the wear resistance is better in Examples 1 to 16 that satisfy all the requirements for the base material (cutting tool) according to the present disclosure than in Comparative Examples that do not satisfy the requirements for the base material (cutting tool) according to the present disclosure.

It should be construed that embodiments and examples disclosed herein are given by way of illustration in all respects, not by way of limitation. It is intended that the scope of the present disclosure is defined by claims, not by the above embodiments, and encompasses all modifications and variations equivalent in meaning and scope to the claims.

REFERENCE SIGNS LIST

1 base material (cutting tool); 11 body portion; 110 binder phase of body portion; 111 first hard phase of body portion; 12, 14 surface portion; 120 binder phase of surface portion; 121 first hard phase of surface portion; 13 surface layer.

The invention claimed is:
1. A base material made of a cemented carbide,
the cemented carbide including a first hard phase and a binder phase,
the first hard phase consisting of WC particles,
the binder phase including at least one element selected from Co and Ni,
the base material comprising a body portion, and a surface portion provided on a surface of the body portion,
the surface portion having a thickness less than or equal to an average particle size in the first hard phase, and
a ratio of an area proportion of the binder phase in a surface of the surface portion to an area proportion of the binder phase in a cross section of the body portion being not less than 1.2 and not more than 2.0.
2. The base material according to claim 1, wherein
the cemented carbide further includes a second hard phase, and
the second hard phase is made of a compound of at least one element selected from the group consisting of Group IV elements and Group V elements in the periodic table, and at least one element selected from the group consisting of C, N, O and B, or a solid solution of the compound.
3. The base material according to claim 2, wherein
the second hard phase is included in a state of being dispersed in the binder phase.
4. The base material according to claim 2, wherein
the at least one element selected from the group consisting of Group IV elements and Group V elements in the periodic table is at least one element selected from the group consisting of titanium (Ti), zirconium (Zr), hafnium (Hf), vanadium (V), niobium (Nb), and tantalum (Ta).
5. The base material according to claim 2, wherein
the compound is at least one selected from the group consisting of TIC, NbC, TaC, ZrC, ZrCN, VC, TaNbC, TiN, and TiCN.

6. The base material according to claim 2, wherein
an average particle size in the second hard phase ranges from 0.1 to 3.0 μm.

7. The base material according to claim 1, wherein
there is no other layer between the surface portion and the body portion that has a different composition from that of the surface portion or the body portion.

8. The base material according to claim 1, wherein
the first hard phase is included in a state of being dispersed in the binder phase.

9. The base material according to claim 1, wherein
the body portion has a uniform structure.

10. The base material according to claim 1, wherein
the ratio of the area proportions of the binder phase is not less than 1.4 and not more than 1.7.

11. The base material according to claim 1, wherein
the average particle size in the first hard phase ranges from 0.1 to 5.0 μm.

12. The base material according to claim 1, wherein
the base material is for a cutting tool.

13. A cutting tool comprising the base material according to claim 1.

14. The cutting tool according to claim 13, comprising a coating on at least a part of a surface of the base material.

\* \* \* \* \*